US011199722B2

United States Patent
Chiu et al.

(10) Patent No.: US 11,199,722 B2
(45) Date of Patent: Dec. 14, 2021

(54) LENS DRIVER FOR CAMERA

(71) Applicant: AAC Optics Solutions Pte. Ltd., Singapore (SG)

(72) Inventors: Ching-Chung Chiu, Shenzhen (CN); Shikama Kazuo, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 218 days.

(21) Appl. No.: 16/719,977

(22) Filed: Dec. 18, 2019

(65) Prior Publication Data
US 2020/0310148 A1 Oct. 1, 2020

(30) Foreign Application Priority Data

Mar. 29, 2019 (JP) .............................. JP2019-066929

(51) Int. Cl.
*H04N 5/225* (2006.01)
*G02B 27/64* (2006.01)
*G03B 9/08* (2021.01)
*H04N 5/232* (2006.01)

(52) U.S. Cl.
CPC ............. *G02B 27/646* (2013.01); *G03B 9/08* (2013.01); *H04N 5/23248* (2013.01); *H04N 5/2254* (2013.01)

(58) Field of Classification Search
CPC .... G02B 27/646; G03B 9/08; H04N 5/23248; H04N 5/2254
USPC ..................................................... 348/207.99
See application file for complete search history.

(56) References Cited

U.S. PATENT DOCUMENTS

| | | | |
|---|---|---|---|
| 2010/0182696 A1* | 7/2010 | Hasegawa | G02B 27/646 359/557 |
| 2015/0160469 A1* | 6/2015 | Wakamatsu | H04N 5/23258 348/208.11 |
| 2016/0241787 A1* | 8/2016 | Sekimoto | H04N 5/23212 |
| 2020/0225503 A1* | 7/2020 | Nagano | H04N 5/23248 |
| 2021/0215902 A1* | 7/2021 | Lim | G02B 7/09 |

FOREIGN PATENT DOCUMENTS

| JP | 2009531729 B2 | 9/2009 |
|---|---|---|
| JP | 2013190653 B2 | 9/2013 |
| JP | 2015537247 B2 | 12/2015 |

\* cited by examiner

*Primary Examiner* — Usman A Khan
(74) *Attorney, Agent, or Firm* — W&G Law Group

(57) ABSTRACT

Provided is a lens driver movable in a direction parallel to an optical axis, arranged on a lens driver movable in a plane orthogonal to the optical axis, and accommodated in a casing. The lens driver includes: a fixture base, a support frame A, a lens module, a spring piece, a first driving coil, a magnet and a yoke. The lens driver includes: a base; a connection terminal and a conductive member A arranged on the base; a support frame B supported by a support part; a conductive member B arranged on the support frame; a center holding part for keeping the base and the support frame B at a center of the optical axis; a second driving coil arranged on the base; and a magnetic detecting element. The lens driver provided can achieve purposes of anti-image dithering and simplifying assembly to obtain good image quality.

10 Claims, 4 Drawing Sheets

LENS DRIVER FOR CAMERA

TECHNICAL FIELD

The present disclosure relates to the technical field of drivers, and in particular, to a lens driver having an anti-shake function.

BACKGROUND

With rapid development of photography technologies, the demand for image quality has become higher than ever, especially when shooting night scenes, etc., in order to improve the quality of photography in the dark, shutter speed has been paid more attention. In order to increase the shutter speed, it is necessary to add a bright lens or an image anti-shake function. A lens driver using image anti-shake correction is applied to various portable electronic devices, such as mobile phones, tablets, etc., which are particularly popular in consumers.

A driving mechanism of the lens driver suitable for a general portable electronic device is usually formed by a coil and a magnet, and the coil is fixed to a periphery of a lens holder. When a current is applied to the coil, the coil moves the lens holder along a direction of an optical axis of the lens due to an electromagnetic force, thereby enabling focusing. However, when a user takes a picture by holding an electronic device with a hand, shaking of the hand will make the lens driver shake. Therefore, the lens sometimes moves continuously in a direction orthogonal to the optical axis of the lens. As a result, in the lens driver, influence of the shaking hand cannot be avoided, resulting in deterioration in the quality of the image.

In addition, for a conventional device for correcting shaking of the hand, a base module portion driven in the direction orthogonal to the optical axis and a lens module portion driven in the direction parallel to the optical axis respectively need to apply force to the driving direction, a support of the shaft, securing for an energizing path, combination and division of the driving power, complexity in assembly may cause deteriorated productivity.

Therefore, it needs to provide a new lens driver that can solve the above problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
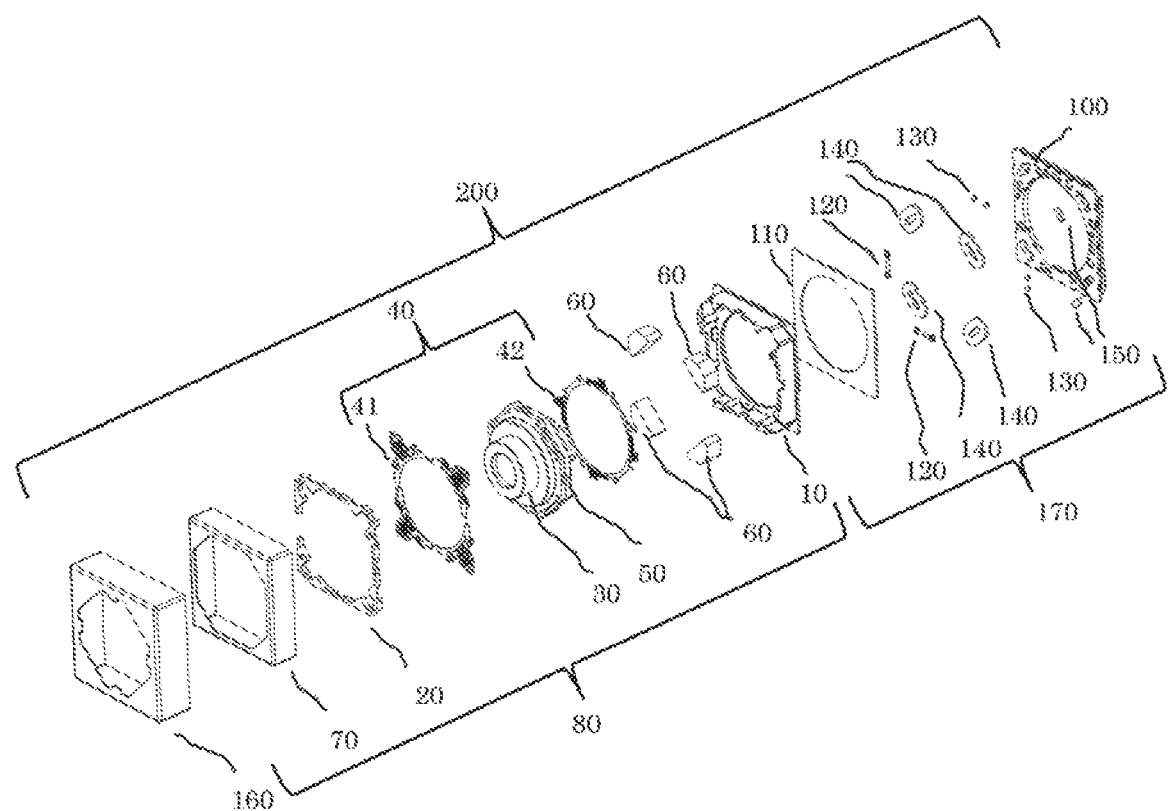
FIG. 1 is an exploded perspective view of a lens driver according to an embodiment of the present disclosure.
Figure 2:
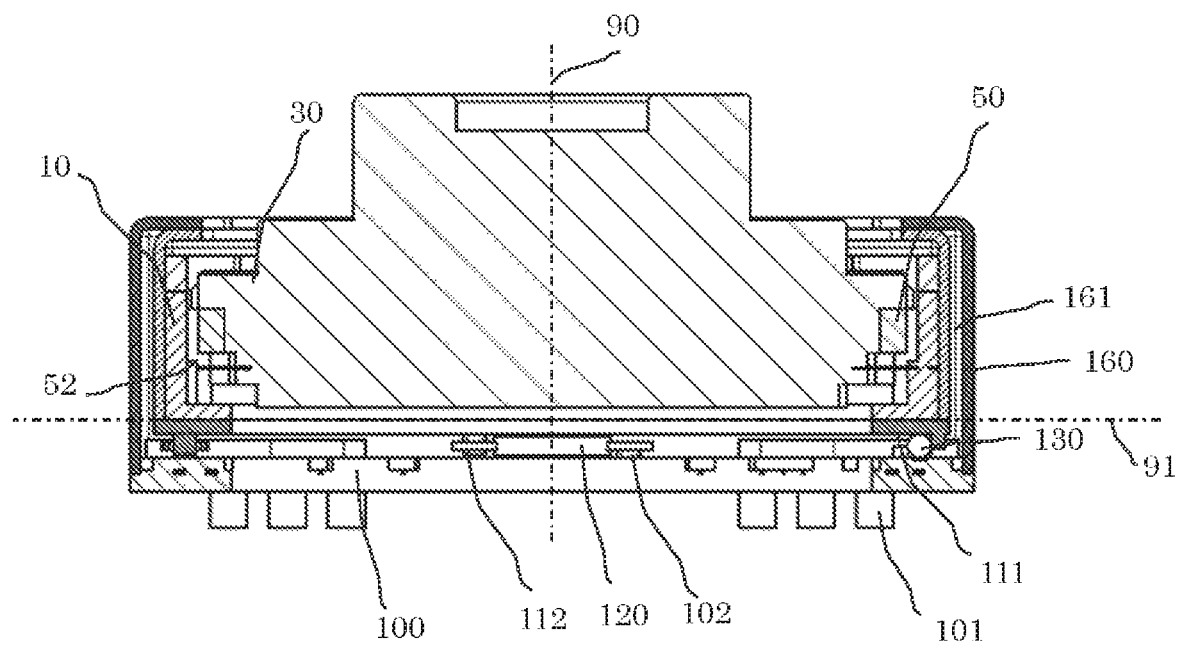
FIG. 2 is a cross-sectional view of a lens driver according to an embodiment of the present disclosure.
Figure 3:
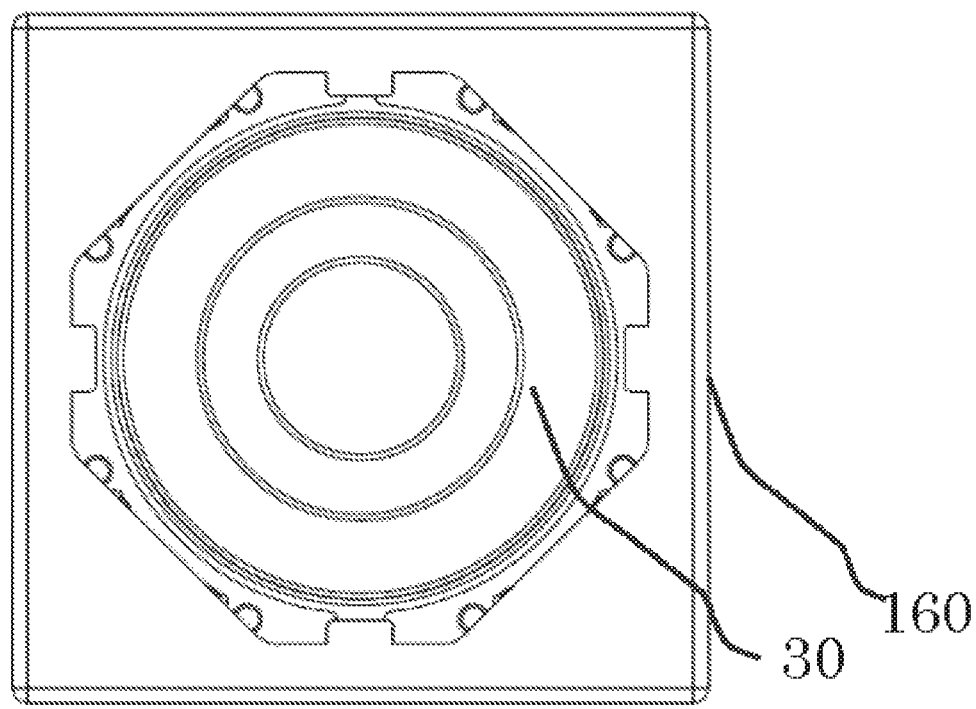
FIG. 3 is a front view of a lens driver according to an embodiment of the present disclosure.
Figure 4:
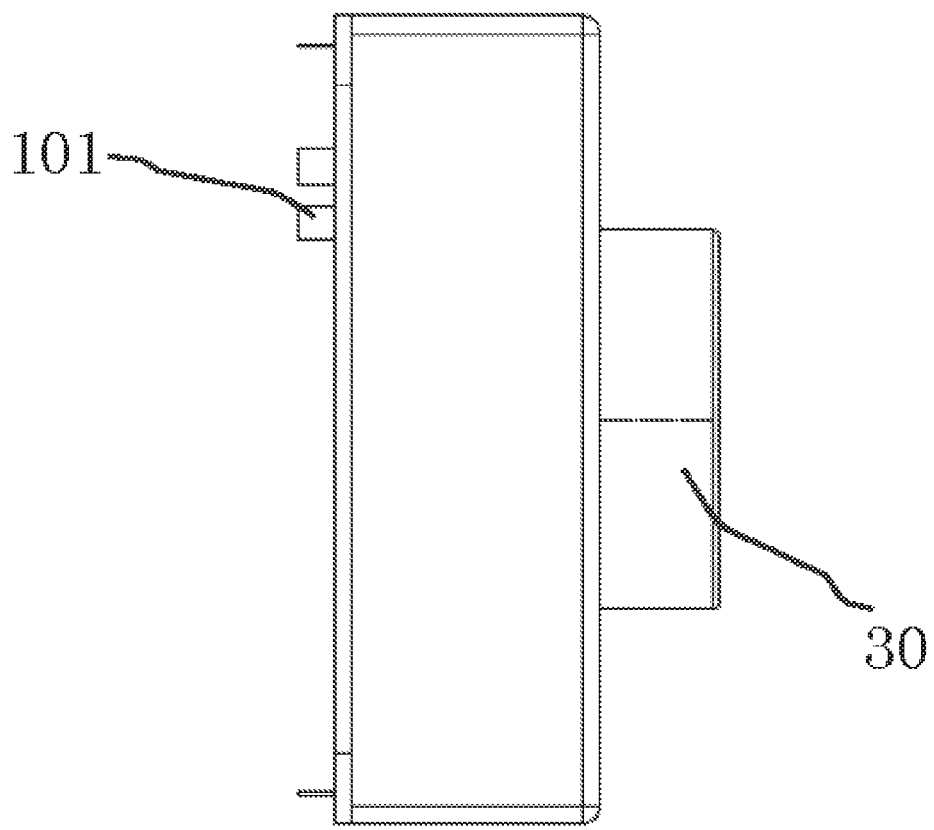
FIG. 4 is a left side view of a lens driver according to an embodiment of the present disclosure.

In the following, the present disclosure will be described in details with reference to the accompanying drawings.

FIGS. 1-4 show a lens driver 200 according to an embodiment of the present disclosure.

The lens driver 200 includes: a lens driver 80 including a yoke 70 and a fixture base 10 and movable in a direction parallel to an optical axis, and another lens driver 170 including a support frame B110 and a base 100 and movable in a plane orthogonal to the optical axis. The lens drivers are accommodated in an accommodation space formed by a casing 160 and the base 100.

The lens driver 80 movable in the direction parallel to the optical axis is accommodated in the accommodation space 161 formed by the casing 160 and the base 100. The fixture base 10 mounted with magnets 60 is provided with a lens module 30 clamped between an upper spring piece 41 and a lower spring piece 42, and a first driving coil 50 winding the lens module 30. A support frame A20 is arranged on the upper spring piece 41.

The yoke 70 is designed as a cover. In this way, a unit is formed.

The support frame B110 is accommodated in the accommodation space 161 of the casing 160.

The lens driver 80 movable in the direction parallel to the optical axis is supported on an upper portion of the support frame B110, and the lens module 30 included in the lens driver 80 movable in the direction parallel to the optical axis includes at least one lens (not shown).

The first driving coil 50 winds and is fixed on the lens module 30, and is disposed opposite to the magnet 60.

The magnets 60 are mounted and fixed between the support frame A20 and the fixture base 10.

The spring piece 40 is connected to coil ends of the first driving coil 50 winding the lens module 30 and has a conduction function, and is arranged on an upper surface portion and a lower surface portion of the lens module 30 and acts as an elastic member for supporting motion along a direction of the optical axis of the lens.

The upper spring piece 41 and the first driving coil 50 are configured to be centrosymmetric about a center line consistent with the optical axis of the lens, that is, are positioned at positions substantially symmetrical about the center line.

The lens module 30 is wound by the first driving coil 50, and the first driving coil 50 is disposed opposite to the magnets 60. Due to electromagnetic interaction between the first driving coil 50 and the magnets 60, the lens module is movable in the direction of the optical axis of the lens to enable focusing.

The lens driver 170 movable in the plane orthogonal to the optical axis includes a base 100, a second driving coil 140 fixed to the base 100, a support frame B110, center holding part 120 as an elastic member, and at least one support part 130.

The at least one support part 130 is arranged on the base 100 and supports the support frame B110 and the fixture base 10.

Figure 5:
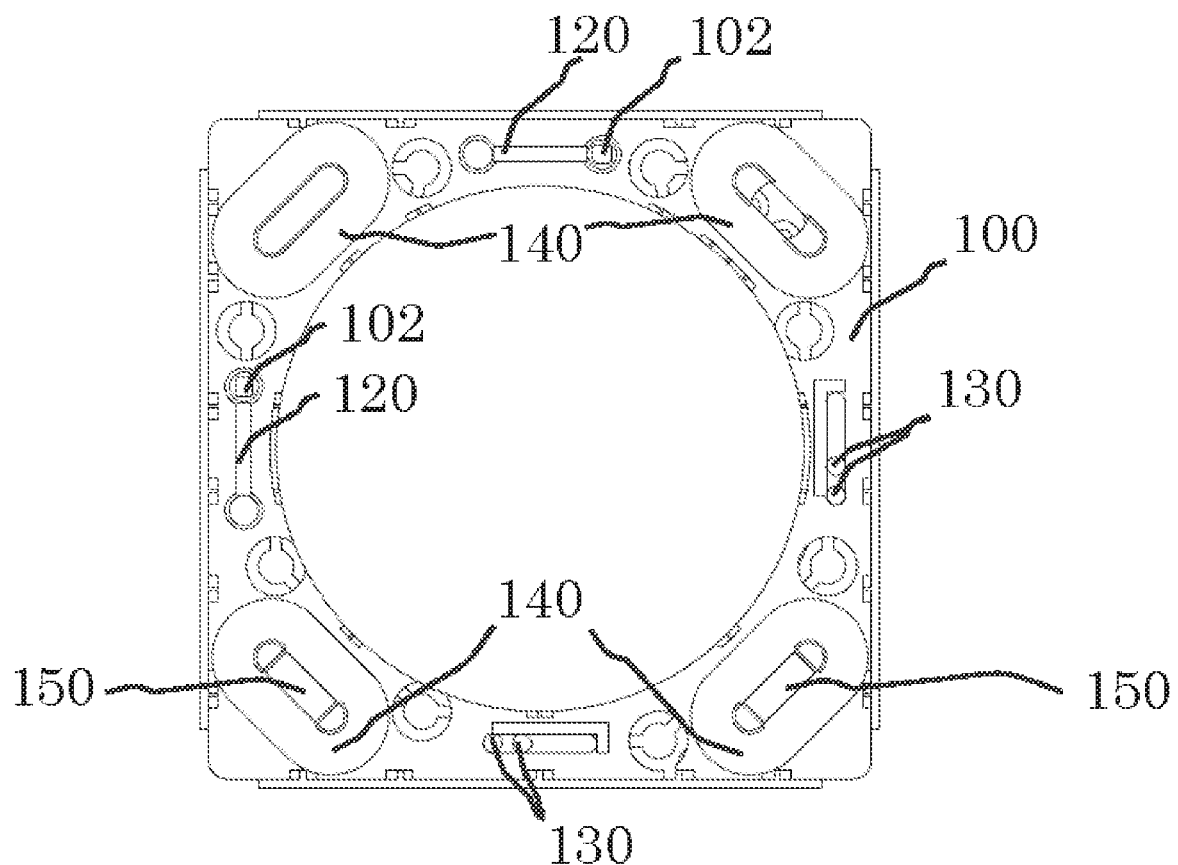
FIG. 5 is a front view of a lens driver, except for a support frame, movable in a direction parallel to an optical axis according to an embodiment of the present disclosure.

The at least one support part 130 may be a ball. As shown in FIG. 5, the at least one support part 130 preferably includes at least two support parts 130 with respect to one position, and the support frame B110 is provided with a ball supporting surface 111 for supporting the support parts 130.

With rolling of the support parts 130, the support frame B110 can freely move relative to the base 100 along the direction orthogonal to the optical axis of the lens.

In order avoid dropping of the support parts 130, a guide 113 is arranged at the support frame B110 and the base 100 for holding the support parts.

The center holding part 120 as the elastic member is an elastic holding member that connects the base 100 with the support frame B110.

The center holding part 120 is mounted and fixed to the base 100, and has a function of pulling the support frame B110 toward the optical axis and moving the support frame B110 toward a center of the optical axis when the support frame B110 moves in the plane orthogonal to the optical axis.

A second driving coil 140 is arranged on the base 100.

The magnets 60 disposed opposite to the first driving coil 50 have four magnets 60 disposed opposite to the second driving coil 140, and the four magnets 60 are configured to be centrosymmetric about the center line consistent with the optical axis of the lens, that is, are positioned at positions substantially symmetrical about the center line.

The second driving coil 140 may be a wounded hollow coil mounted and fixed to the base 100, or may be a conductive pattern formed on the base 100. Due to electromagnetic interaction between the second driving coil 140 and the magnets 60, the support frame B110 is movable relative to the base 100 along the direction orthogonal to the optical axis of the lens, thus achieving an adjustment related to movement of the optical axis of the lens.

Figure 6:
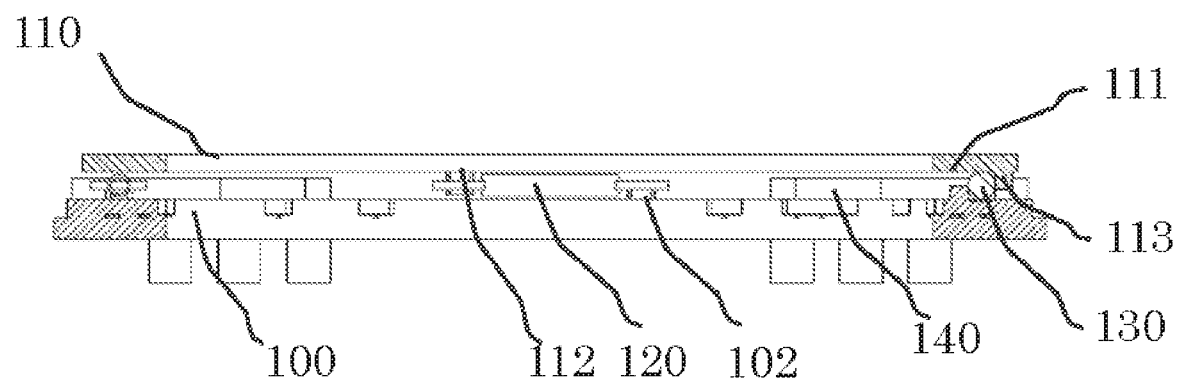
FIG. 6 is a cross-sectional view of a lens driver, except for a support frame, movable in a direction parallel to an optical axis according to an embodiment of the present disclosure.

As shown in FIGS. 5-6, at least one conductive member A102 and at least one conductive member B112 are arranged at the base 100 and the support frame B110.

The at least one conductive member B112 can be separately provided from and combined with the support frame B110 and can be integrated with the support frame B110.

The at least one conductive member A102 includes two conductive members A102 arranged on the fixture base 10. One of the two conductive members A102 has an end connected to the center holding part 120. The center holding part 120 has another end connected to one of two conductive members B112 arranged on the support frame B110, to the lower spring piece 42, and to an end of the first driving coil 50.

In addition, the conductive member A102 and the center holding part 120 are integrated by thermocompression bonding (not shown), or the conductive member A102 and the center holding part 120 are shaped as quadrangles or the like (not shown), thereby always maintaining positions of the fixation base 10 and the center holding part 120.

The other one of the two conductive members A102 is connected to an end of a second center holding part 120. The second center holding part 120 has another end connected to a second conductive member B112 arranged on the support frame B110, to the upper spring piece 41, and to the another end of the first driving coil 50. By implementing conduction between two center holding parts 120, two above-mentioned conductive members A102, and two conductive members B112 arranged on the base, it is possible to supply power to the lens driver that is movable in the direction parallel to the optical axis.

In addition, the conductive member B112 and the center holding part 120 are integrated by thermocompression bonding (not shown), or the conductive member B112 and the center holding part 120 are shaped as quadrangles or the like (not shown), thereby always maintaining positions of the support frame B110 and the center holding part 120.

The second driving coil 140 is electrically connected to a connection terminal 101, and the connection terminal 101 is arranged on the base and connected to external devices. The second driving coil 140 may also be connected to at least one magnetic detecting element 150, and the at least one magnetic detecting element 150 may or may not have a second driving circuit. The at least one magnetic detecting element 150 having the second driving circuit is arranged at positions opposite to the magnets 60, thereby being capable of detecting a position of the magnet 60 moving together with the support frame B110.

When the optical axis of the lens moves due to shaking or there is a tendency to move, a current can flow into the second driving coil 140. Since the second driving coil 140 is fixed, based on a principle of force and counterforce, the support frame B110 has one side efficiently keeping balance with respect to a gravity center of a moving object, and another side moving relative to the base 100 along the direction orthogonal to the optical axis of the lens, or can suppress moving tendency of the optical axis of the lens. Therefore, movement of the optical axis of the lens can be adjusted.

In addition, with such a structure, the lens driver 80 movable in the direction parallel to the optical axis and the lens driver 170 movable in the plane orthogonal to the optical axis can be individually assembled, and can be individually inspected or the like. Therefore, manufacturing process is facilitated and a structure thereof is simplified, and thus a lens driver with high precision can be manufactured.

Figure 7:
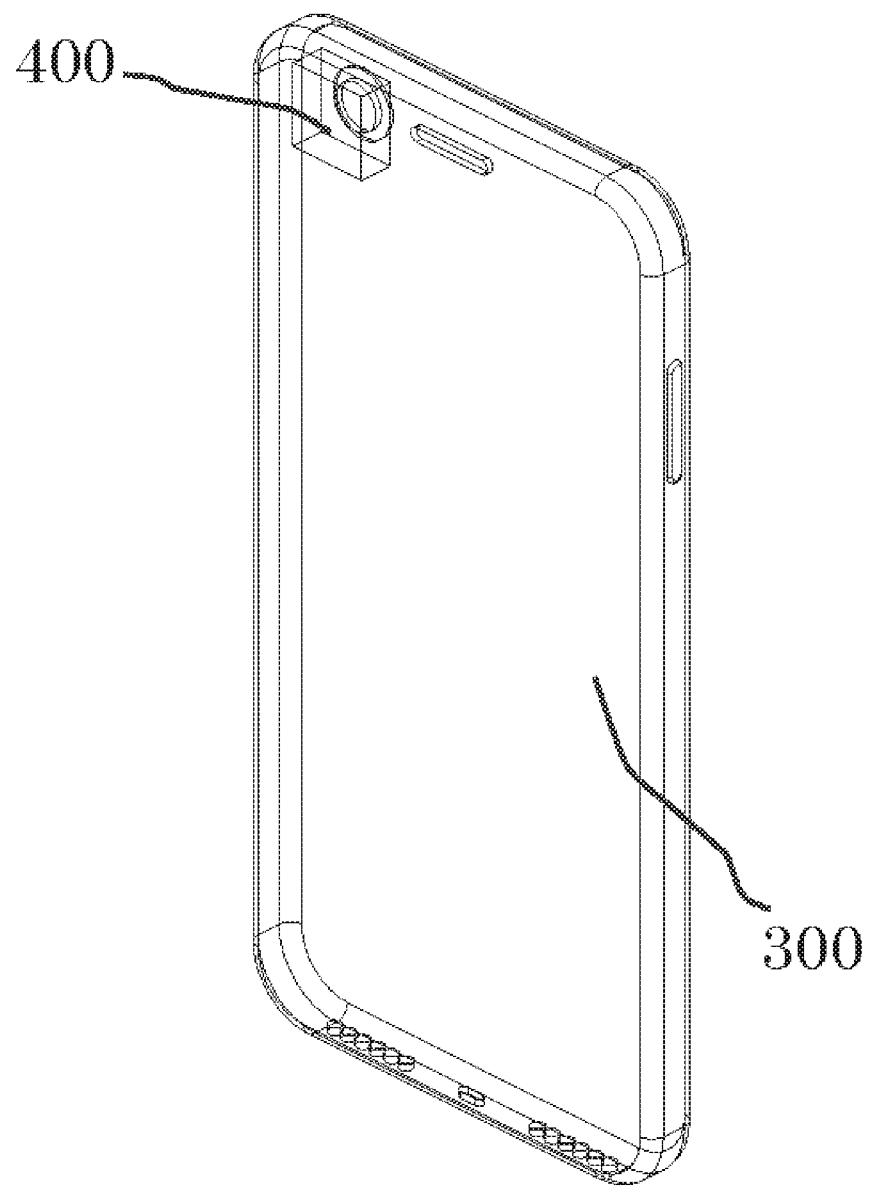
FIG. 7 shows a portable electronic device (a portable information terminal) having a lens driver according to an embodiment of the present disclosure.

The above-mentioned lens driver 200 can also be used in an imaging device 400 for a portable information device 300, such as a smart cellphone, a functional cellphone or a tablet device as shown in FIG. 7.

According to the lens driver 200 provided by the present disclosure, it can achieve adjustment of movement of the optical axis of the lens, so that a purpose of anti-shake can be achieved, thereby improving quality of image.

As an advantage of the present disclosure, the lens driver provided by the present disclosure combine separate structures to drive movement in the direction parallel to the optical axis of the lens and movement in the direction perpendicular to the optical axis of the lens, so that movements will not interfere with each other, thereby achieving the purpose of excellent anti-shake for the image and the purpose of simplifying assembly thereof. In this way, the quality of the image is improved.

The above description is merely related to preferred embodiments of the present disclosure, which do not make limitations to the scope of the present disclosure, and all equivalent modifications or variations made by those skilled in the art based on the present disclosure shall fall into the protection scope of the present disclosure.

REFERENCE SIGNS 10 fixture base
20 support frame A
30 lens module
40 spring piece
41 upper spring piece
42 lower spring piece
50 first driving coil
60 magnet
70 yoke
80 lens driver movable in direction parallel to optical axis
90 direction parallel to optical axis 91 plane orthogonal to optical axis
100 base
101 connection terminal arranged at base and connected to external devices
102 conductive member A
110 support frame B
111 ball supporting surface
112 conductive member B
113 guide of support part
120 center holding part
130 support part
140 second driving coil
150 magnetic detecting element having second driving circuit
160 casing
161 accommodation space
170 lens driver movable in plane orthogonal to optical axis
200 lens driver
300 portable information device
400 imaging device.

What is claimed is:

1. A lens driver, comprising:
a lens driver movable in a plane orthogonal to an optical axis; and
a lens driver movable in a direction parallel to the optical axis,
wherein the lens driver movable in the direction parallel to the optical axis is a unit held by at least one elastic member arranged at both a support frame and a fixture base;
wherein the lens driver movable in the plane orthogonal to the optical axis is a unit comprising the at least one elastic member and supported by a ball, the at least one elastic member connecting the base with the support frame and being configured to keep the support frame at a center with respect to the optical axis,
wherein the lens driver movable in the direction parallel to the optical axis and the lens driver movable in the plane orthogonal to the optical axis are separate, and
wherein the lens driver movable in the direction parallel to the optical axis is arranged on the lens driver movable in the plane orthogonal to the optical axis.

2. The lens driver as described in claim 1, wherein the at least one elastic member arranged on the base of the lens driver movable in the plane orthogonal to the optical axis and configured to keep the support frame at the center with respect to the optical axis is an electric component supplying electric power to the lens driver movable in the direction parallel to the optical axis.

3. The lens driver as described in claim 1, wherein the lens driver movable in the direction parallel to the optical axis comprises two conductive members configured to energize between the support frame and the fixture base, and the two conductive members and the support frame are formed into one piece.

4. The lens driver as described in claim 2, wherein the lens driver movable in the direction parallel to the optical axis comprises two conductive members configured to energize between the support frame and the fixture base, and the two conductive members and the support frame are formed into one piece.

5. The lens driver as described in claim 1, wherein the support frame of the lens driver movable in the direction parallel to the optical axis and one of the at least one elastic member for keeping the support frame at the center with respect to the optical axis are formed into one piece.

6. The lens driver as described in claim 2, wherein the support frame of the lens driver movable in the direction parallel to the optical axis and one of the at least one elastic member for keeping the support frame at the center with respect to the optical axis are formed into one piece.

7. The lens driver as described in claim 1, wherein the fixture base of the lens driver movable in the direction parallel to the optical axis and one of the at least one elastic member for keeping the support frame at the center with respect to the optical axis are formed into one piece.

8. The lens driver as described in claim 2, wherein the fixture base of the lens driver movable in the direction parallel to the optical axis and one of the at least one elastic member for keeping the support frame at the center with respect to the optical axis are formed into one piece.

9. A camera, comprising the lens driver as described in claim 1.

10. A portable electronic device, comprising the camera as described in claim 9.

* * * * *